Patented Oct. 2, 1928.

1,686,112

UNITED STATES PATENT OFFICE.

GEORGE S. TILLEY, OF MILL VALLEY, CALIFORNIA.

SEPARATION OF ALUMINA FROM ALUM.

No Drawing.    Application filed June 3, 1927.    Serial No. 196,402.

The present invention relates to the separation of alumina from alum, with potassium sulfate as a valuable by-product, and the object of the invention is to produce the alumina in a sufficiently pure state for use in making aluminum therefrom.

It is well known that by heating potash alum, to a high temperature such as 1,000° C., it is possible to drive off the sulphur practically completely therefrom, and also to drive off the water of crystallization, whereby alumina and potassium sulfate remain, which materials can be separated from each other by leaching with water. While this operation proceeds in a satisfactory manner on a small scale in the laboratory, it is not possible to utilize this as a commercial means of accomplishing the said result, for the reason that when large masses of potash alum are heated, the alum melts in the water of crystallization, forming a sticky mass which cannot readily be handled by large scale apparatus, and furthermore on account of the fusing and subsequently hardening into dense non-porous masses, the reaction will be incomplete, and the resulting product will contain a large amount of sulphur trioxide in addition to that which is in combination in the form of potassium sulfate.

In accordance with the present invention I have found that it is readily possible to first partially dehydrate the potash alum, by a sufficient heating under proper conditions, after which the resulting material is not fusible or does not melt in the water of crystallization, the material being in such a condition that upon further heating, it may be handled in a large scale apparatus without difficulty, carrying the heat to a temperature sufficient to completely eliminate the $SO_3$ which was originally combined with alumina.

In carrying out this process I preferably heat potash alum slowly, and maintain the temperature for some hours at a temperature from 80 to 85° C., in a current of air or other inert gas, and under these conditions, preferably with the stirring of the mass, it is possible to drive out more than one half of the water of crystallization from the alum, without having the crystals melt or be converted into an unleachable condition. The crystals during this operation turn chalky-white in appearance, and become substantially porous, but do not readily break down into a powder to any large extent, but on the contrary the crystals largely retain their original size and form. This operation is preferably conducted until substantially more than one half of the total water of crystallization has been driven off.

When this condition has been reached the operation can be continued by further heating the material, and this heating may be carried out quite rapidly, to a temperature of about 800 to 1,000° C., to drive off all or substantially all of the sulphur trioxide which was originally combined with the alumina, the sulphur trioxide being absorbed and utilized by methods already well known in the art. For example the gases leaving the calcining furnace may be absorbed in strong sulphuric acid to produce sulphuric acid of practically 100% concentration, or oleum, and any resulting sulphur dioxide in the gases may be suitably recovered.

The solid residue from the high temperature treatment will be found to consist substantially of potassium sulphate and aluminum oxide. By leaching the mass with water, either hot or cold, preferably hot, the potassium sulphate is dissolved and pure alumina is left, which may be dried and calcined if desired, and can be used for the production of metallic alumina, by methods known in the art.

It will be understood that the conversion of the aluminum of the starting material into potash alum, followed by crystallization of the alum is a desirable step to perform in the process, for the purpose of completely separating certain impurities which may be present in the initial raw material used, notably iron.

The solution of potassium sulfate may be concentrated in any desired manner, and potassium sulfate crystallized therefrom, or the solution of potassium sulfate may be concentrated to any desired degree, or to complete dryness, and the potassium sulfate used in the preparation of additional quantities of alum for reuse in the present process.

In the high heating operation it is possible to employ apparatus for simultaneously heating and agitating the mass of material, for example a rotary kiln may be used. It will be understood that the temperature used in this operation should not be sufficiently high to cause the potassium of the potassium sulfate to react with the alumina to form potassium aluminate with the liberation of the sulphur trioxide of the potassium sulphate. This operation would of course defeat the object of the invention, which is to produce alumina in a substantially pure state, with soluble potassium sulfate as a readily recoverable by-product. This latter operation does not go on to any appreciable extent at 800 to 1000° C., but does go on to substantial and increasing extents, at temperatures substantially above this, for example at temperatures of 1200 to 1500° C. Any excessive local overheating of the alum should accordingly be avoided.

It will be understood that in the operation of driving off the $SO_3$ content of the aluminum sulphate constituent of the alum, there may be more or less decomposition of the $SO_3$ into $SO_2$ and O. This however does not have to be taken into consideration particularly in connection with the present invention, since the $SO_3$ can be readily absorbed for example in strong sulphuric acid, after which the gases still containing the $SO_2$ can be treated in any appropriate manner for the absorption and recovery of the latter, for example the residual gases from the first absorber can be passed into lead chambers for the production of sulphuric acid, can be passed into milk of lime for the production of sulfites, or can be otherwise suitably employed.

A current of air or inert gas may be passed over or through the material under treatment during the second or high temperature stage of the process, if desired, which will much accelerate the reaction. The leached residue may contain traces of sulphur, usually not over 0.1%. During the first stage of the process, it is important not to heat to over 85° C., during any part of this first stage, otherwise the material, even if it does not fuse, may sinter together to an undesirable extent.

I claim :—

1. In the treatment of potash alum, the herein described improvement which comprises heating the crystallized alum first to a temperature substantially below that at which it would melt in its water of crystallization, maintaining the temperature for a sufficient period to remove over one half of the water of crystallization, thereafter heating said material to about 800 to 1000° C., to drive off the $SO_3$ which is initially combined with the alumina.

2. In the treatment of potash alum, the herein described improvement which comprises heating the crystallized alum first to a temperature of about 80 to 85° C., whereby said alum does not melt in its own water of crystallization, maintaining the temperature for a sufficient period to remove over one half of the water of crystallization, thereafter heating said material to about 800 to 1000° C., to drive off the $SO_3$ which is initially combined with the alumina.

3. In the treatment of potash alum, the herein described improvement which comprises heating the crystallized alum first to a temperature substantially below that at which it would melt in its water of crystallization, maintaining the temperature for a sufficient period to remove over one half of the water of crystallization, thereafter heating said material to a sufficiently higher temperature to drive off the $SO_3$ which is initially combined with the alumina.

4. In the treatment of potash alum, the herein described improvement which comprises heating the crystallized alum first to a temperature substantially below that at which it would melt in its water of crystallization, maintaining the temperature for a sufficient period to remove over one half of the water of crystallization, thereafter heating said material to about 800 to 1000° C., to drive off the $SO_3$ which is initially combined with the alumina and thereafter leaching the soluble constituents of said product, to leave $Al_2O_3$ in an insoluble state.

5. In the treatment of potash alum, the herein described improvement which comprises heating the crystallized alum first to a temperature substantially below that at which it would melt in its water of crystallization, maintaining the temperature for a sufficient period to remove over one half of the water of crystallization, thereafter heating said material to about 800 to 1000° C., to drive off the $SO_3$ which is initially combined with the alumina, without carrying the temperature to a sufficiently higher degree to drive off the $SO_3$ content of the $K_2SO_4$.

In testimony whereof I affix my signature.

GEORGE S. TILLEY.